(12) United States Patent
Robinson

(10) Patent No.: US 8,113,817 B2
(45) Date of Patent: Feb. 14, 2012

(54) MOLDING APPARATUS

(75) Inventor: Dan Robinson, Bolivar, MO (US)

(73) Assignee: Tamko Building Products, Inc., Joplin, MO (US)

( * ) Notice: Subject to any disclaimer, the term of this patent is extended or adjusted under 35 U.S.C. 154(b) by 733 days.

(21) Appl. No.: 11/284,197

(22) Filed: Nov. 21, 2005

(65) Prior Publication Data

US 2007/0114697 A1 May 24, 2007

(51) Int. Cl.
*B29C 45/72* (2006.01)
(52) U.S. Cl. .......................................... 425/549; 425/567
(58) Field of Classification Search .................. 425/116, 425/121, 128, 542, 567, 572, 588, 547, 549
See application file for complete search history.

(56) References Cited

U.S. PATENT DOCUMENTS

| | | | | |
|---|---|---|---|---|
| 4,496,302 | A * | 1/1985 | Brown | 425/547 |
| 4,755,131 | A * | 7/1988 | Schmidt | 425/549 |
| 5,443,381 | A * | 8/1995 | Gellert | 425/549 |
| 5,753,155 | A * | 5/1998 | Hanusa | 264/46.5 |
| 6,042,356 | A * | 3/2000 | Murphy | 425/130 |
| 6,139,309 | A * | 10/2000 | Kotaki | 425/542 |
| 6,220,850 | B1 * | 4/2001 | Catoen et al. | 425/549 |
| 6,776,599 | B2 * | 8/2004 | Street et al. | 425/116 |
| 2001/0036492 | A1 * | 11/2001 | Wright et al. | 425/549 |
| 2004/0208949 | A1 * | 10/2004 | Niewels | 425/549 |
| 2004/0247736 | A1 * | 12/2004 | Elliot | 425/549 |

FOREIGN PATENT DOCUMENTS

| | | | |
|---|---|---|---|
| DE | 10110611 | A1 * | 11/2002 |
| JP | 08336865 | A * | 12/1996 |
| JP | 11262934 | A * | 9/1999 |

* cited by examiner

*Primary Examiner* — Joseph Del Sole
*Assistant Examiner* — Ryan Ochylski
(74) *Attorney, Agent, or Firm* — Husch Blackwell LLP

(57) ABSTRACT

A molding apparatus is configured with article molding regions that receive a direct flow of a molding material feed such that external flow channels are not needed. The article molding regions are formed into front sides of opposed "A" and "B" surface mold tools that, when moved into a mating relationship with one another, form closed molding cavities within which molded articles are generated from molding material feed. The article molding regions each generally have a body bounded by a perimeter that establishes an outer edge for an article molded in the one of the closed molding cavities. With at least the "A" surface mold tool, a port is coupled with the body of each article molding region to establish a direct pathway is through which the molding material feed flows to enter the article molding regions, and thus the closed molding cavity, without having to flow along the tool front sides outside of the article molding regions. A distribution channel extends to each port to deliver the molding material feed and a moveable blocking pin is provided for each port to alternately prevent the molding material feed from flowing through the respective port to reach the closed molding cavity and allow the molding material to flow through the respective port to reach the closed molding cavity.

17 Claims, 4 Drawing Sheets

MOLDING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Conventional injection molding processes have been modified to create composite structural members that combine polymers with filler materials. For instance, composite shingles have been fabricated in a closed molding process utilizing various combinations of rubber (e.g., ground up tire rubber), thermoplastics (e.g., polyolefins, polyvinyl chloride, etc.) or other polymers, and fillers (e.g., glass, stone, limestone, talc, mica, cellulosic materials such as wood flour, rice hulls, etc.), along with colorants, and optionally, suitable UV inhibitors, lubricants and other additives that aid in the molding process and provide favorable physical properties to the finished composite shingles (e.g., heat reflection, certain weathering characteristics, physical strength, etc.). Two popular types of composite shingles formed in a closed molding process including composite shake shingles and composite slate shingles. Different mold tools are created for each type of composite shingle, each with its own surface texturing or contouring to be imparted to the molded article.

One general formulation that has been found to be suitable for a molded composite shingle is to use around 35-70% polymer and 30-65% filler by weight of the components, along with small amounts of colorants and other additives. More specifically, polymers that have been found to be useful in forming composite shingles include polyethylene or other polyolefins, or polyvinyl chloride, as well as crushed limestone or a similar stone as a filler. Using such a high percentage of stone or other relatively abrasive fillers in a material feed within a closed molding process can be problematic however. With conventional injection molding, a highly flowable, generally low abrasive polymer resin is heated and moved through various ports into a molding cavity under pressure. To get good flow characteristics from a material feed containing a high amount of abrasive fillers, the feed must also be heated and maintained at an elevated temperature until it fills the mold cavity where an article is being formed. Furthermore, the temperature at which the material feed with abrasive fillers must be maintained to achieve good flow may not be the same as the ideal curing temperature for the article in the mold cavity. Thus, it can be difficult to achieve desired heating characteristics when certain flow paths are utilized in molding these types of composite articles.

One prior surface mold tool construction used to form composite shingles is illustrated in FIG. 1. The tool 10 depicted is only the "A" member of a molding device, in this case the female member having a base surface 12 where one or more concave article molding regions 14 are disposed to form a top surface and side edges of a molded composite slate shingle. An opposed "B" tool member is not shown, but is generally designed to mirror the perimeter edge 16 of the "A" tool 10 at the base surface 12 to enclose the article molding region 14 for curing of the molding material feed into the finished shingle article. The "B" tool member has its own article molding regions to establish the shape of a bottom surface of the composite slate shingle, and may be flat, recessed below or extending above a base surface thereof. To deliver the material feed to the article molding regions 14 of the "A" member tool 10 and the "B" member tool, combining to form molding cavities (not shown), a flow channel 18 is formed into the base surface 12 of at least the "A" member tool 10. The flow of material feed to a start point 20 of the flow channel 18 may be accomplished by various distribution channels (not shown), either internal or external to the "A" and "B" member tools.

With the design of the "A" member tool 10 of the prior art, the abrasive material feed flow must travel from the start point 20 up a vertical section 22 of the flow channel 18, and then turn down transverse sections 24 to enter one of two article molding regions 14. This type of flow pattern is problematic in that the abrasive material of the material feed wears heavily on surfaces of the "A" and "B" member tools where the flow is caused to change direction. The flow channel 18 also makes it difficult to maintain the material feed at the optimal temperature for flowing into the molding cavity (i.e., the article molding region 14). Another problem is that the conventional flow channel design creates an external "gate" along the sides of the molded composite article. When the molded composite articles are curing within the molding cavity, the material feed present in the flow channel also cures to form the gate. This extra piece interconnects adjacent molded composite shingles and must be later removed because it serves no useful purpose as a roofing product. A robotic mechanism that removes the cured shingles from the article molding regions must also take the shingles to a location where the gate is broken off to reveal the finished roofing product. This process can require complex robotic movements if it is desired to move the shingles to a location where they can be packaged without having to put down the shingles to remove the gate, and then pick them back up again. Furthermore, it is often difficult to recycle the waste gate pieces for use in another molding cycle. This is because the abrasive material makeup (e.g., stone) causes extensive wear on regrinding or other processing equipment that conditions the gates for reuse as raw material feed.

SUMMARY OF THE INVENTION

A molding apparatus is provided for forming one or more molded articles by providing molding material feed directly into an article molding region to form a molded article without the need for an external flow channel to supply molding material. In one aspect, the molding apparatus includes opposed "A" and "B" surface mold tools each having base surfaces within which are formed one or more article molding regions. The article molding regions of the "A" surface mold tool are aligned to mate with the article molding regions of the "B" surface mold tool, such that when the mold tools are brought together, one or more closed molding cavities are formed within which molded articles are generated from molding material feed. The article molding regions each generally have a body bounded by a perimeter that establishes an outer edge for an article molded in the one of the closed molding cavities. With at least the "A" surface mold tool, a port is coupled with the body of each article molding region away from the base surface so that a direct pathway is established through which the molding material feed flows to enter the article molding regions, and thus the closed molding cavity. A distribution channel extends to each port to deliver the molding material feed and a moveable blocking pin is provided for each port to alternately prevent the molding material feed from flowing through the respective port to reach the closed molding cavity and allow the molding material to flow through the respective port to reach the closed molding cavity.

Movement of the blocking pin may be controlled hydraulically and in a reciprocating fashion between an extended position and a retracted position according to activity within the closed molding cavity. A hollow heat sink may also be included in the molding apparatus to surround each port, with a flow of fluid provided to the heat sink to provide cooling to the port and the blocking pin which become heated upon exposure to the flow of the molding material.

By locating the port within each article molding region of at least the "A" surface mold tool such that direct material feed flow is accomplished, gating may be eliminated from around the outer edge of the molded article. Therefore, the extra processing steps in conventional methods of fabrication to remove such gating from a molded article are not needed.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION OF THE INVENTION

Figure 2:
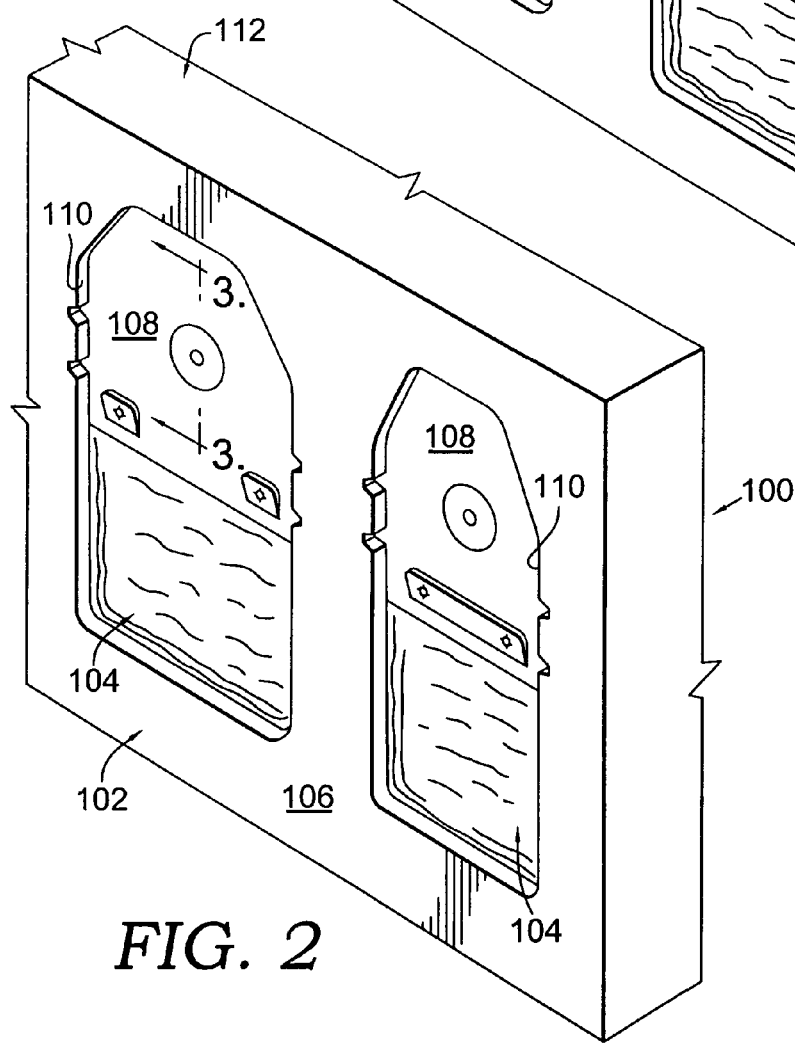
FIG. 2 is a perspective view of one embodiment of a surface mold tool of the present invention employing a port positioned for providing molding material feed directly into an article molding region.
Figure 3:
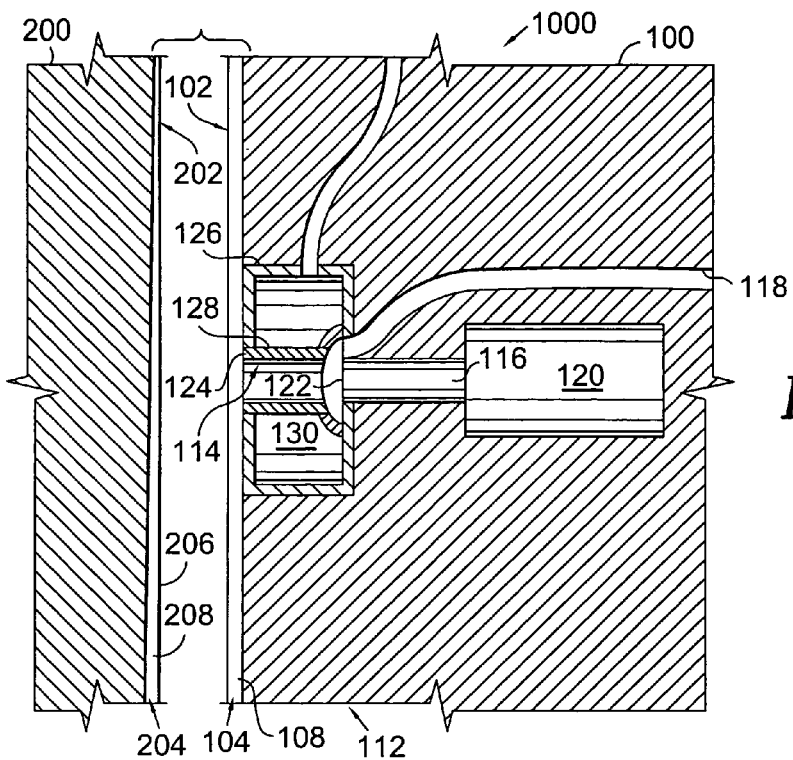
FIG. 3 is a cross-sectional view taken along line 3-3 showing features within the surface mold tool of FIG. 2 along with an opposed surface mold tool.

Turning now to FIG. 2, there is illustrated one embodiment of a surface mold tool 100 of the present invention. The surface mold tool 100 may also be referred to as an "A" surface mold tool that mates with an opposed "B" surface mold tool 200 as shown in FIGS. 3-6 to form a molding apparatus 1000 with one or more closed molding cavities 300 in which molded articles 400, such as composite shingles, are formed. The "A" surface mold tool 100 and "B" surface mold tool 200 each have front sides 102 and 202 onto which one or more article molding regions 104 and 204, respectively, are formed. More specifically, the front sides 102 and 202 of the "A" tool 100 and "B" tool 200 have base surfaces 106 and 206 that face one another and surround the respective article molding regions 104 and 204. Each article molding region 104 of the "A" tool 100 has a body 108 bounded by a perimeter 110. Likewise, the article molding region 204 of the "B" tool 200 has a body 208 bounded by a perimeter that mates generally with the perimeter 110 of the "A" tool body 108 to establish outer or side edges 402 for the molded article 400 formed within the regions 104 and 204. The article molding regions 104 and 204 are designed, therefore, to set the shape and surface characteristics of the molded articles 400, with each individual article molding region 104 of the "A" tool 100 combining with one individual article molding region 24 of the "B" tool 200 to form one closed molding cavity 300. For the exemplary "A" tool 100 of FIG. 2, each body 106 creates a top surface 404 and the side edges 402 of the molded article 400 in the form of a composite slate shingle, and each mating body 206 of the "B" tool 200 creates a bottom surface 406 of the shingle. However, the configuration of each body 108 and 208 of the "A" and "B" tools 100 and 200 may be switched such that the "A" tool body 108 creates the article bottom surface 406 and the "B" tool body 208 creates the a top surface 404 and side edges 402, or both tool bodies 108 and 208 may be configured to create the side edges 402 together. The exemplary "A" tool 100 body 108 is formed with texturing to create the top surface 404 of a shingle that will be exposed when installed on a building roof with a look that resembles a natural slate shingle.

Although the "A" tool 100 is shown to have a pair of article molding regions 104 in FIG. 2, any number of article molding regions 104 (and mating article molding regions 204 of the "B" tool 200) may be provided as a matter of design choice. For instance, one, three, four or any other number of article molding regions 104 and 204 may be chosen. Additionally, article molding regions 104 and 204 may be recessed below their respective base surfaces 106 and 206, or extend above such surfaces 106 and 206, in order to form molded articles 400 with the desired surface characteristics and features.

The "A" tool 100 has a back portion 112 behind the front side 102, as best seen in FIGS. 3-6. For each article molding region 104, a port 114 and a blocking pin 116 moveable to prevent the passage of a material feed flow 500 through the port 114 to the region 104 are provided in the back portion 112. One or more distribution lines 118 are connected with each port 114 to deliver the material feed flow 500 to the port 114. The distribution lines 118 extend from a location where the raw ingredients that form the material feed flow 500 are melted to a liquid form that can exhibit fluid flow characteristics for delivery to the article molding region 104. For example, one manner of creating the material feed flow 500 to form a composite shingle relies on the use of a mixer and extruder. The raw ingredients for composite shingle formation are mixed in the mixer (e.g., a kinetic mixer) and then passed through the extruder. The mixture emerging from the extruder may be sliced into small pellets by a rotary knife so that the material can be more easily conveyed through piping under air pressure or suction to a storage location for use when needed (e.g., in a storage bin). Thereafter, the pellets are extracted from storage and fed a melting chamber along with colorant or other additives to create the material feed flow 500. The port 114 may take the form of a hollow cylinder, or tube, with the blocking pin 116 having a cylindrical shape sized to fit within the port 114 to block the flow of material feed flow 500 from the distribution lines 118 to the port 114. Also, a hydraulic mechanism 120 preferably controls the intermittent reciprocation motion of extension and retraction of the blocking pin 116 at preselected times during a molding cycle for proper delivery of the material feed flow 500 to the article molding region 104 (and thus, the closed molding cavity 300) for molding an article 400.

Figure 1:
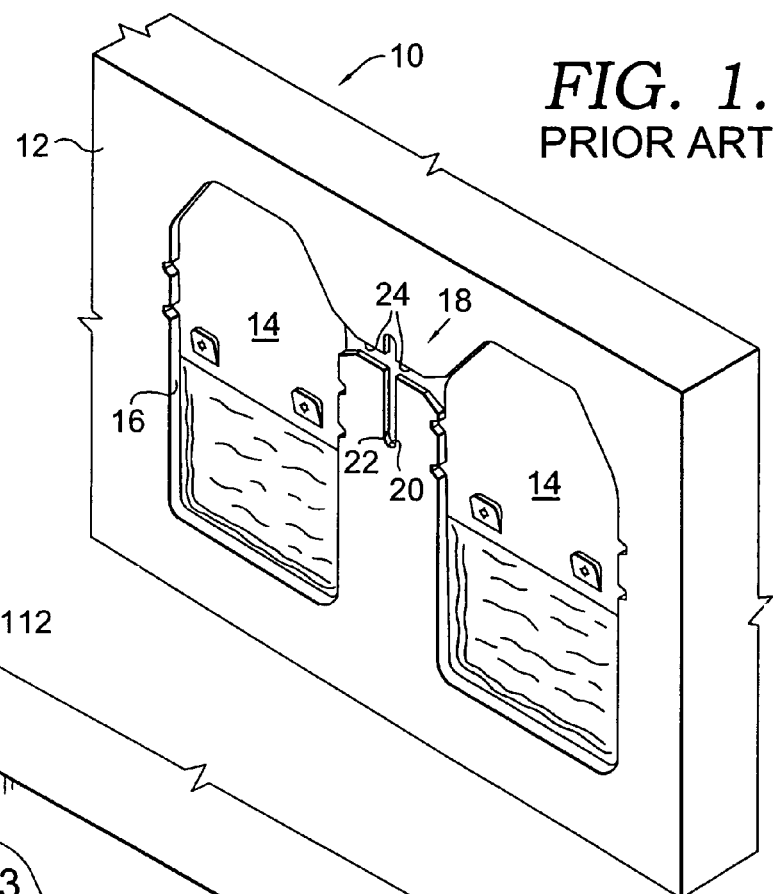
FIG. 1 is a perspective view of one surface mold tool of the prior art having an external flow channel.
Figure 5:
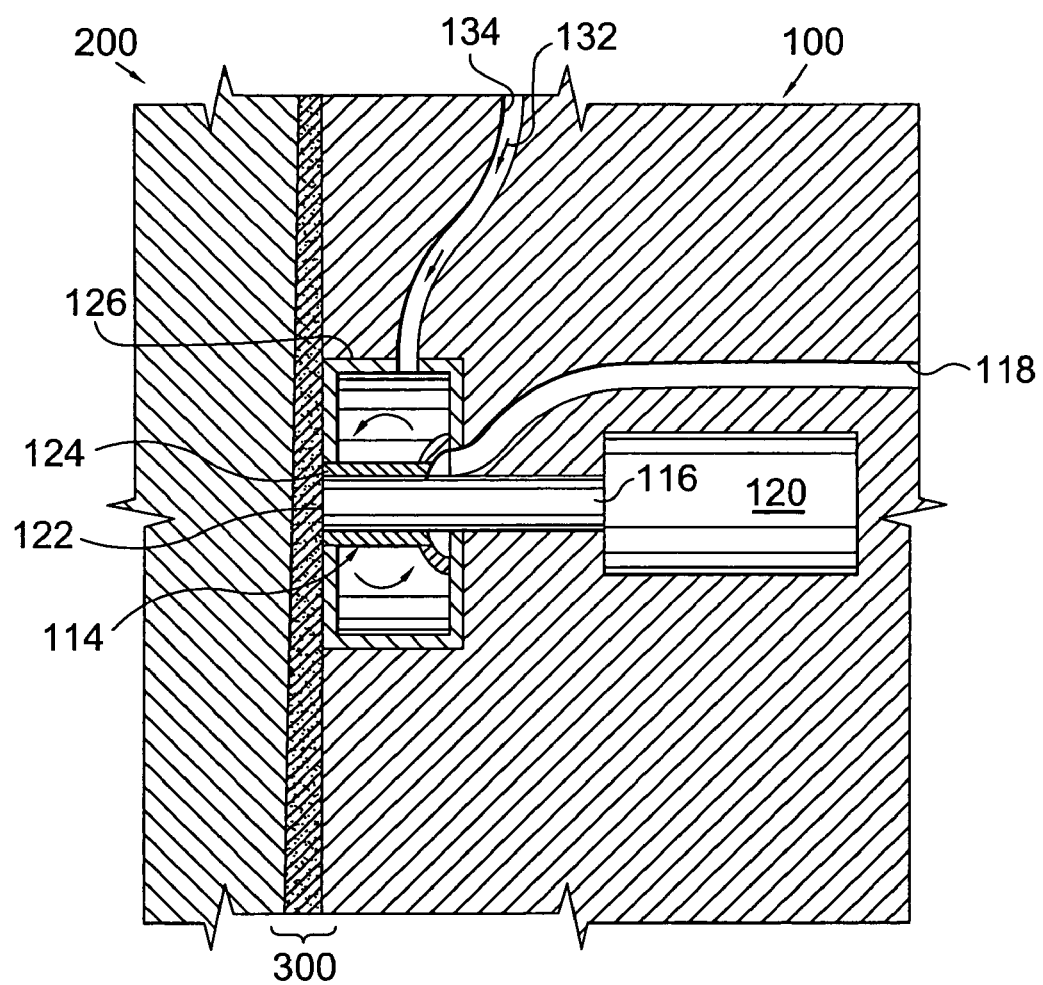
FIG. 5 is a sectional view similar to FIG. 4 showing a blocking pin extended to shut off the flow of flow of material feed into the article molding region during curing of the molded article.

The abrasive characteristics of material feed flows 500 containing limestone or other abrasive fillers used in the formulation for composite shingles generate frictional heat that is transferred to the port 114 and the blocking pin 116. In addition, a terminal end 122 of the blocking pin 116 and an output end 124 of the port 114 are exposed to the heat generated by the molding process within the closed molding cavity 300, as depicted in FIG. 5. To remove heat energy from the port 114 and the blocking pin 116 during filling of the closed molding cavity 300 with the material feed flow 500 and when the blocking pin 116 is extended to cut off flow to the cavity 300 to cure the molded article 400, a heat sink 126 is positioned to circumscribe an outer surface 128 of the port 114. The heat sink 126 has a chamber 130 for receiving a cooling fluid 132 from a supply line 134. Other take-off lines (not shown) may be in fluid communication with the chamber 130 to allow for continual circulation of cooling fluid 132 into the heat sink 126 and removal of fluid that has absorbed heat energy. Various heaters (not shown) may be provided within the back portion 112 of the "A" tool 100 for heating the article formation regions 104 and 204 of the "A" tool 100 and the "B" tool 200, and for heating a material feed supply source so that the distribution lines 118 bring the material feed flow 500 to each port 114 at the desired temperature for good flow characteristics, both through the distribution path and within the closed molding cavity 300 to fully fill the cavity. Because the material feed flow 500 does not follow a complex pathway along the front sides 102 and 202 of the "A" tool 100 and "B" tool 200 outside of the article molding regions 104 and 204, as opposed to the prior art design of FIG. 1 where the feed flow reaches the article molding regions 14 external of the "A" tool 10, it is much easier to control the temperature of the flow 500 prior to entering the closed molding cavity 300. The flow path for the material feed flow 500 in the "A" tool 100 also avoid the creation of external gating along the side edges 402 of the molded articles 400 (e.g., in the shape of the flow channel 18 of FIG. 1) that has to be removed before the articles are installed on a structure (e.g., a roof).

It should be understood that the "B" tool 200 may also have, for each opposed article molding region 204, a port 114 and a blocking pin 116 along with one or more distribution lines 118 to deliver additional material feed flows 500 directly into the body 208 of the region 204 in the same way as in the "A" tool 100. Additional ports 114 and corresponding blocking pins 116 may also be provided for each article molding region 104 and 204 of the "A" tool 100 and "B" tool 200, so that each region 104 and 204 may have multiple pathways for material feed flows 500 directly into the corresponding body regions 108 and 208 thereof.

In use, one or both of the "A" tool 100 and "B" tool 200 are moveable to bring together the front sides 102 and 202 and align pairs of opposed article molding regions 104 and 204 to matingly receive one another, each pair forming one closed molding cavity 300. For instance, with the embodiment of the "A" tool 100 illustrated in FIG. 2, a pair of closed molding cavities 300 would be formed. However, the molding process with respect to one closed molding cavity 300 will now be described.

Figure 4:
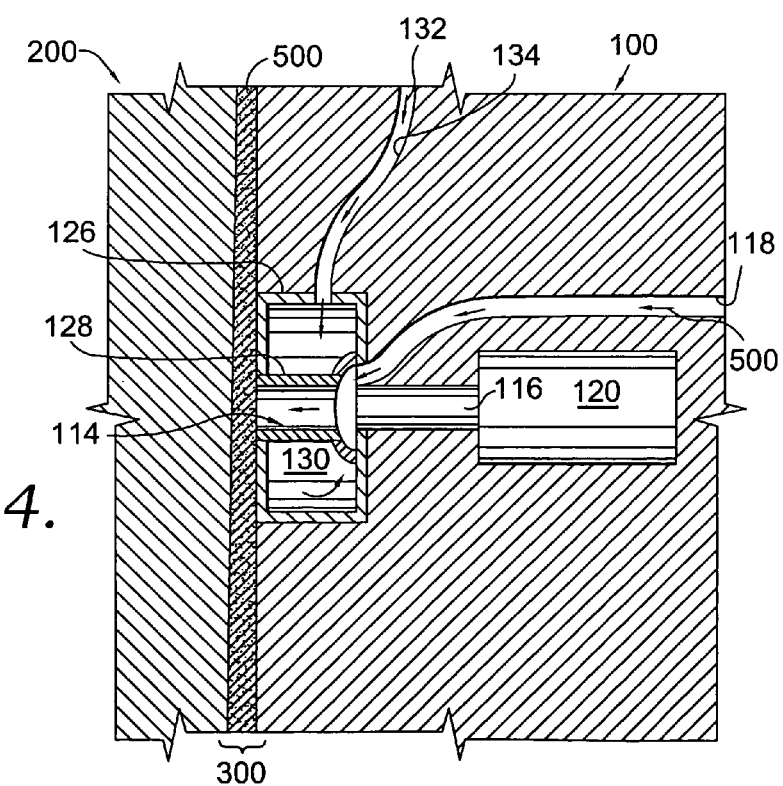
FIG. 4 is a sectional view similar to FIG. 3 showing the opposed surface mold tool mating with the surface mold tool of FIG. 2 during flow of material feed into the article molding region.
Figure 6:
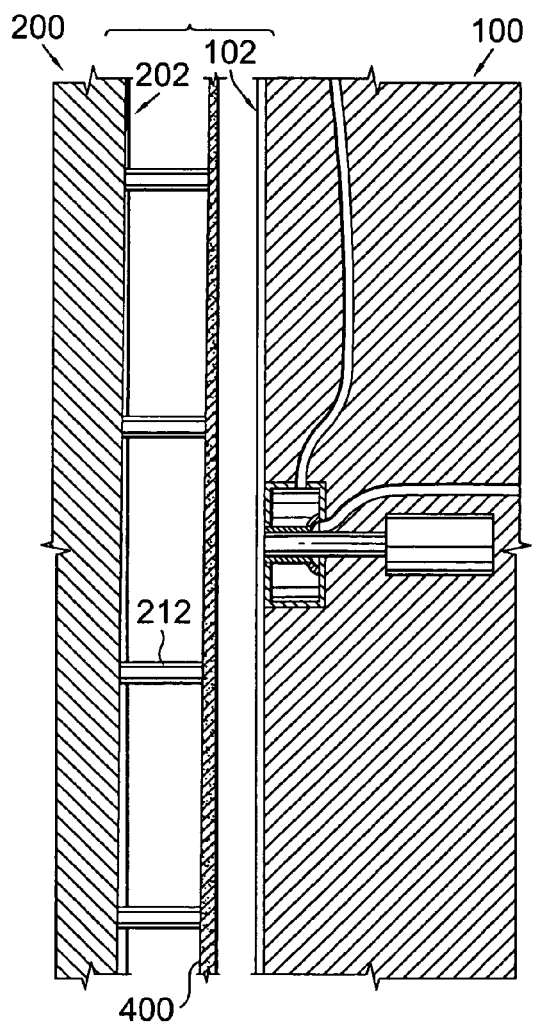
FIG. 6 is a sectional view similar to FIG. 3 showing the molded article removed from the article molding region of the surface mold tool of FIG. 2.
Figure 7:
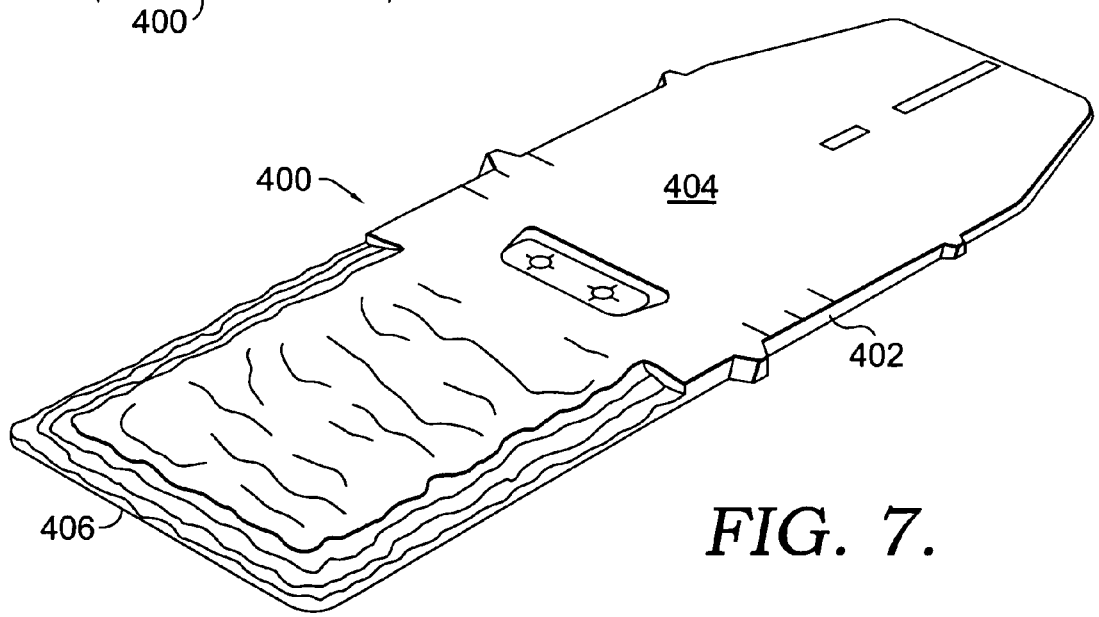
FIG. 7 is a perspective view of a molded article formed by the present invention as a composite shingle.

Once the closed molding cavity 300 is formed, the blocking pin 116 is then moved to the retracted position if the pin 116 is not already in such a position. This allows the material feed flow 500 for each article formation region 104 to travel down the distribution line 118 from the supply source and move through the port 114 to enter the closed molding cavity 300, as depicted in FIG. 4. Optionally, the heat sink 126 may receive the cooling fluid 132 within the chamber 130 for cooling of the port 114. Once a sufficient amount of material feed is moved into the closed molding cavity 300, as depicted in FIG. 5, the hydraulic mechanism 120 extends the blocking pin 116 into the port 114 to shut off the material feed flow 500 and fully enclose the molding cavity 300 so that heat may be applied to the cavity 300 and pressure built up within the cavity 300 to fully cure the article 400. At this point, it is preferable to circulate the cooling fluid 132 through the heat sink 126 to remove heat energy from the port 114 and the blocking pin 116 while curing of the molded article 400 is taking place. Once a sufficient amount of time has passed for article 400 curing, the front sides 102 and 202 of the "A" tool 100 and "B" tool 200 are separated, as depicted in FIG. 6. Suction arms 212 then extend from the "B" tool front side 202 to grasp the molded article 400 under a vacuum draw and allow a robot arm (or the like) to move between the separated tools 100 and 200 and grab the molded article 400 (e.g., under another vacuum draw). The robot arm, or other device, moves the article 400 onto a conveyor belt or other conveying mechanism for delivery of the article 400 to a packaging location where it may be packaged with other molded articles 400 for storage or shipment. Notably, no gating has to be removed after the cured article 400 is moved out of the molding cavity 300.

Therefore, the molding apparatus 1000 facilitates molding article formation by providing a molding material feed 500 directly into an article molding region 104 without the need for an external flow channel to supply molding material. Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A molding apparatus comprising:
   a first surface mold tool having a base surface with at least one article molding region formed into the base surface, each article molding region having a body bounded by a perimeter that defines a complete outer edge for a molded article;
   at least one thermally conductive longitudinally extending port coupled to one article molding region of the first surface mold within the body and away from the base surface, each port comprising a substantially hollow member having an inner surface and an outer surface, said inner surface defining a shaped passageway wherein molding material flows through said shaped passageway into said article molding region to form a molded article;
   at least one distribution channel extending to each port for delivering the molding material to the respective port;
   at least one moveable blocking pin shaped to correspond to the shaped passageway of the at least one port, each pin operatively extending and retracting to alternately prevent the molding material from flowing through the shaped passageway and reaching one article molding region of the first surface mold tool and allow the molding material to flow through the shaped passageway and reach one article molding region of the first surface mold tool, said pin shaped and sized to matingly fill the longitudinal extent of the shaped passageway and to be in thermal communication with the inner surface of the at least one port when the pin is in the extended condition;
   at least one heat sink comprising a hollow chamber partially defined by the outer surface of the at least one port, the hollow chamber defining a fluid space for holding a cooling fluid, wherein the cooling fluid is supplied via a supply line, directly contacts and circumscribes the outer surface of the at least one port, and exits the chamber via a take-off line thereby cooling the at least one port and also cooling the at least one blocking pin when the at least one blocking pin is in the extended condition; and a second surface mold tool opposing the first surface mold tool and having a base surface with at least one article molding region formed into the base surface and configured to mate with the at least one article molding region of the first surface mold tool to form at least one closed molding cavity within which at least one molded article is formed, the at least one closed molding cavity being formed when the first surface mold tool and second surface mold tool are brought together upon movement of at least one of the first surface mold tool and the second surface mold tool.

2. The apparatus of claim 1, wherein each article molding region of the first surface mold tool is recessed below the base surface thereof.

3. The apparatus of claim 1, wherein movement of the at least one moveable blocking pin is controlled hydraulically.

4. The apparatus of claim 1, wherein the at least one closed molding cavity is configured for molding shingle-like articles.

5. The apparatus of claim 1, wherein the perimeter of each article molding region of the first surface mold tool is configured to prevent molding material from flowing between adjacent article molding regions of the first surface mold tool.

6. The apparatus of claim 1, wherein the heat sink entirely circumscribes the at least one port.

7. The apparatus of claim 1, wherein the heat sink circumscribes an entire length of the at least one port.

8. The apparatus of claim 1, wherein the chamber for holding a cooling fluid directly contacts and circumscribes the at least one port.

9. The apparatus of claim 1 wherein said terminal end of said at least one blocking pin is substantially planar and an output end of the at least one port and the terminal end of said at least one blocking pin substantially align when said at least one blocking pin is in the extended condition thereby creating a substantially smooth finished surface on the molded article at an interface between said port and said molded article.

10. The apparatus of claim 9 wherein at least one of said molded articles is a composite shingle.

11. The apparatus of claim 1 further comprising the first surface mold tool having a base surface with a first said article molding region and a second said article molding region;
a first said longitudinally extending port coupled to the first said article molding region and a second said longitudinally extending port coupled to the second said article molding region;
a first said distribution channel operably coupled to the first said longitudinally extending port and a second said distribution channel operably connected to the second said longitudinally extending port;
a first said moveable blocking pin configured to engage the first said longitudinally extending port and a second said moveable blocking pin configured to engage the second said longitudinally extending port;
a first said heat sink proximate the first said longitudinally extending port and a second said heat sink substantially encircling the second said longitudinally extending port; and
the second surface mold tool having a first said article molding region and a second said article molding region forming a first and second said closed molding cavity when the first surface mold tool and second surface mold tool are brought together;
wherein the configuration of the molding apparatus does not require gating between the first closed molding cavity and the second closed molding cavity.

12. In a molding apparatus including opposed first and second surface mold tools each including a front side and a back portion, the front side of the first and second surface mold tools having an article molding region mateable with one another to form a closed molding cavity within which a molded article is formed, the improvement comprising:
the article molding region of at least the first surface molding tool having a body bounded by a perimeter that defines an outer edge for the molded article;
a thermally conductive cylindrical port coupled to the body of the article molding region of the first surface molding tool, the cylindrical port comprising a substantially hollow member having an inner surface and an outer surface, the inner surface defining a shaped passageway to provide molding material flow therethrough directly into the body within the perimeter from the back portion to the front side of the first surface mold tool;
a distribution channel extending from the back portion to the port for delivering the molding material flow to the port;
a cylindrical blocking pin moveable to accomplish blocking of the molding material flow through the port by completely filling the shaped passageway of the cylindrical port when the blocking pin is in an extended position, as well as allowance of the molding material flow through the shaped passageway to reach the article molding region when the pin is withdrawn from the cylindrical port, and wherein the cylindrical blocking pin is in thermal communication with the inner surface of said cylindrical port when the blocking pin is in the extended position; and
a heat sink comprising a hollow chamber partially defined by the outer surface of the at least one port, the hollow chamber defining a fluid space for holding a cooling fluid, wherein the cooling fluid is supplied via a supply line, directly contacts and circumscribes the outer surface of the port, and exits the heat sink via a take-off line thereby cooling the cylindrical port and also cooling the cylindrical blocking pin when the blocking pin is in the extended position.

13. The apparatus of claim 12, wherein the article molding region of the first surface mold tool and the second surface mold tool each comprise two or more article molding regions, each article molding region of the first surface mold being mateable with one article molding region of the second surface mold to form each closed molding cavity, the improvement further comprising an additional port, distribution channel and moveable blocking pin for each additional article molding region of the first surface mold.

14. The apparatus of claim 13, wherein the perimeter of each article molding region of the first surface mold tool is configured to prevent molding material from flowing between adjacent article molding regions of the first surface mold tool.

15. The apparatus of claim 12, wherein the article molding region of the first surface mold tool has a base surface, the article molding region being recessed into the base surface.

16. The apparatus of claim 12, wherein movement of the blocking pin is controlled hydraulically.

17. The apparatus of claim 12, wherein the closed molding cavity is configured for molding shingle-like articles.

* * * * *